(12) United States Patent
Imada et al.

(10) Patent No.: US 7,588,630 B2
(45) Date of Patent: Sep. 15, 2009

(54) CARBON DIOXIDE ABSORBENT, CARBON DIOXIDE SEPARATING APPARATUS, AND REFORMER

(75) Inventors: Toshihiro Imada, Yokohama (JP); Yasuhiro Kato, Yokohama (JP); Masahiro Kato, Naka-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 368 days.

(21) Appl. No.: 11/686,531

(22) Filed: Mar. 15, 2007

(65) Prior Publication Data

US 2008/0072760 A1 Mar. 27, 2008

(30) Foreign Application Priority Data

Sep. 27, 2006 (JP) ............................. 2006-263042
Dec. 27, 2006 (JP) ............................. 2006-353317

(51) Int. Cl.
*B01D 53/62* (2006.01)
*B01J 20/10* (2006.01)
(52) U.S. Cl. .................... 96/146; 423/230; 502/407; 502/411; 422/173
(58) Field of Classification Search .......... 96/108, 96/143, 146; 95/139; 423/220, 230; 502/400, 502/407, 411; 422/168, 173, 177
See application file for complete search history.

(56) References Cited

U.S. PATENT DOCUMENTS

| 6,387,845 | B1 | 5/2002 | Masahiro et al. |
| 6,712,879 | B2 | 3/2004 | Kato et al. |
| 2005/0214203 | A1 | 9/2005 | Essaki et al. |
| 2006/0211570 | A1 | 9/2006 | Kato et al. |
| 2007/0072768 | A1 | 3/2007 | Essaki et al. |
| 2007/0072769 | A1 | 3/2007 | Imada et al. |

FOREIGN PATENT DOCUMENTS

| JP | 2000-262890 | 9/2000 |
| JP | 2001-96122 | 4/2001 |
| JP | 2002-274809 | 9/2002 |
| JP | 2004-98018 | 4/2004 |
| JP | 2004-217471 | 8/2004 |

OTHER PUBLICATIONS

U.S. Appl. No. 11/551,955, filed Oct. 23. 2006, Imada et al.

*Primary Examiner*—Frank M Lawrence
(74) *Attorney, Agent, or Firm*—Oblon, Spivak, McClelland, Maier & Neustadt, L.L.P.

(57) ABSTRACT

A carbon dioxide absorbent includes lithium silicate containing lithium orthosilicate and lithium metasilicate, the lithium metasilicate being contained in an amount of 5% by weight or more to 40% by weight or less with respect to the total amount of lithium orthosilicate and lithium metasilicate, where the lithium metasilicate produced by reaction of the lithium orthosilicate and carbon dioxide is excluded.

17 Claims, 1 Drawing Sheet

CARBON DIOXIDE ABSORBENT, CARBON DIOXIDE SEPARATING APPARATUS, AND REFORMER

CROSS-REFERENCE TO RELATED APPLICATIONS

This application is based upon and claims the benefit of priority from prior Japanese Patent Applications No. 2006-263042, filed Sep. 27, 2006; and No. 2006-353317, filed Dec. 27, 2006, the entire contents of both of which are incorporated herein by reference.

BACKGROUND OF THE INVENTION

1. Field of the Invention

The present invention relates to a carbon dioxide absorbent, a carbon dioxide separating apparatus and a reformer, and more particularly to a carbon dioxide absorbent and a carbon dioxide separating apparatus for separating and recovering carbon dioxide from an exhaust gas, a raw material gas or a fuel gas generated from an energy plant, a chemical plant, an automobile and the like which use a raw material or a fuel containing hydrocarbons as a major component; and a reformer for producing and recovering hydrogen from the raw material gas containing carbon such as methane.

2. Description of the Related Art

In order to separate and recover the carbon dioxide in an exhaust gas in combustion equipment such as a motor or the like for burning a fuel containing hydrocarbon as a major component, it is effective to separate and recover the carbon dioxide in the vicinity of a combustion chamber where the concentration of carbon dioxide is high. Thus, the temperature at such a carbon-dioxide recovering place is often a high temperature of 300° C. or more.

In addition, a reaction system is known in which hydrogen is produced as a main produced gas, and carbon dioxide is produced as a by-product gas. For instance, a steam reforming reaction is known in which a fossil fuel containing hydrocarbons as a major component is allowed to react in the coexistence of steam and a catalyst to produce hydrogen as the main product and carbon dioxide or carbon monoxide as the by-product. Furthermore, in chemical industrial processes, a reaction is used in which carbon monoxide is allowed to react with water to produce hydrogen as the main product and carbon dioxide as the by-product. Since the hydrogen as the main product obtained in the reforming reaction and the chemical industrial process is used for a fuel or a raw material, it is required to increase a recovery rate of the hydrogen. In a reaction in which carbon dioxide is produced as the by-product as in the reforming reaction or shift reaction, carbon dioxide is removed from the reaction field. For example, JP-A 11-263988 (KOKAI) discloses separating carbon dioxide from the reaction field of steam reforming. As a result of such removal of carbon dioxide from the reaction field, the chemical equilibrium shifts to the production side of the main product. Accordingly, it becomes possible to increase the recovery rate of a gas as the main product. These reforming reaction and shift reaction are carried out at a temperature of 400° C. or more.

As a conventional technology for separating carbon dioxide from a gas, there are a chemical absorption process by means of an alkanol-amine-based solvent or the like, a pressure swing method, a cryogenic distillation method, a membrane separation process and the like. However, it is required to suppress the upper limit of the temperature of an introducing gas to around 200° C. in any of these methods due to the limit of heat resistance of materials such as a membrane and a solvent to be used for separation of carbon dioxide.

In order to effectively separate and recover the carbon dioxide in a gas exhausted from combustion equipment such as a motor, the process must be conducted in an environment of 300° C. or more. In addition, it is required to remove the carbon dioxide at a temperature of 400° C. or more in a reforming reaction or a shift reaction. In this respect, it has been difficult to remove carbon dioxide from the reaction field by a conventional method.

Under the circumstances, JP-A 2000-262890 (KOKAI) discloses a method of separating carbon dioxide from a high-temperature gas containing the carbon dioxide in a temperature range exceeding 500° C. by using a lithium composite oxide which reacts with the carbon dioxide without accompanying a cooling step. In JP-A 2002-274809 (KOKAI), there is disclosed a method in which a reaction vessel for carrying out a reforming reaction or a shift reaction is filled with a lithium-containing oxide such as lithium zirconate, lithium orthosilicate and the like, whereby carbon dioxide is removed from a high-temperature reaction field exceeding a temperature of 400° C. to effectively obtain a principal product. For instance, in the case of a methane steam reforming system using of a reaction vessel filled with lithium orthosilicate together with a methane reforming catalyst, the steam reforming reaction expressed by the following formula (1) occurs concurrently with an absorption reaction of carbon dioxide by means of lithium orthosilicate expressed by the formula (2) in a reaction vessel of a temperature of around 400 to 650° C.

$$CH_4 + 2H_2O \Leftrightarrow 4H_2 + CO_2 \quad (1)$$

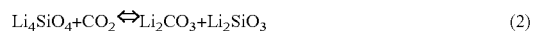

$$Li_4SiO_4 + CO_2 \Leftrightarrow Li_2CO_3 + Li_2SiO_3 \quad (2)$$

The absorption reaction of carbon dioxide (the reaction directing to the right side) by means of lithium orthosilicate which is expressed by the formula (2) proceeds at the fastest at a temperature of around 600° C. A temperature range of the carbon dioxide absorption reaction varies depending on the carbon dioxide concentration under the reaction environment, so that the upper limit temperature of the absorption reaction temperature range increases with the increase in carbon dioxide concentration. When lithium orthosilicate is used to remove carbon dioxide from the steam reaction field of methane, the reaction equilibrium expressed by the formula (1) shifts to the reaction of hydrogen production directing to the right side, whereby the reforming reaction of methane is promoted, resulting in improvements in the recovery percentage of hydrogen. When the lithium orthosilicate which has absorbed carbon dioxide is heated, the reaction expressed by the formula (2) directing to the left side occurs to release the carbon dioxide. Accordingly, the lithium orthosilicate is regenerable. As described above, when a reaction vessel in which a reforming reaction or a shift reaction is carried out is filled with lithium orthosilicate, it becomes possible to remove carbon dioxide and to efficiently and repeatedly obtain hydrogen as the main product.

In this respect, however, when only lithium orthosilicate is used, the absorption rate of carbon dioxide is low so that sufficient speed cannot be obtained. Hence, in JP-A 2001-96122 (KOKAI), it is disclosed that an alkali carbonate such as potassium carbonate, and sodium carbonate is added to lithium orthosilicate, whereby the absorption rate of carbon dioxide is improved to increase the absorption performance.

It has been found, however, that when low concentration carbon dioxide is absorbed by using lithium orthosilicate or lithium orthosilicate to which lithium alkali carbonate is added, a sufficient carbon dioxide absorption rate cannot be obtained. For this reason, when such lithium orthosilicate is used as a carbon dioxide absorbent for absorbing carbon dioxide in a gas used for a methane steam reforming reaction, a shift reaction or the like, a methane conversion rate is low so that hydrogen gas having a high concentration cannot be obtained.

BRIEF SUMMARY OF THE INVENTION

According to a first aspect of the present invention, there is provided a carbon dioxide absorbent comprising: lithium silicate containing lithium orthosilicate and lithium metasilicate, the lithium metasilicate being contained in an amount of 5% by weight or more to 40% by weight or less with respect to the total amount of lithium orthosilicate and lithium metasilicate, where the lithium metasilicate produced by reaction of the lithium orthosilicate and carbon dioxide is excluded.

According to a second aspect of the present invention, there is provided a carbon dioxide separating apparatus comprising:

a reaction vessel provided with introduction and discharge pipes for carbon dioxide;

a carbon dioxide absorbent stored in the reaction vessel, including lithium silicate containing lithium orthosilicate and lithium metasilicate, the lithium metasilicate being contained in an amount of 5% by weight or more to 40% by weight or less with respect to the total amount of lithium orthosilicate and lithium metasilicate, where the lithium metasilicate produced by reaction of the lithium orthosilicate and carbon dioxide is excluded; and heating means disposed around the outer circumference of the reaction vessel for supplying heat to the reaction vessel.

According to a third aspect of the present invention, there is provided a reformer comprising:

a reaction vessel having an introduction pipe which introduces a raw material gas containing carbon and steam, and a discharge pipe which discharges a produced gas a solid catalyst stored in the reaction vessel to promote a reforming reaction;

a carbon dioxide absorbent stored in the reaction vessel, including lithium silicate containing lithium orthosilicate and lithium metasilicate, the lithium metasilicate being contained in an amount of 5% by weight or more to 40% by weight or less with respect to the total amount of lithium orthosilicate and lithium metasilicate, where the lithium metasilicate produced by reaction of the lithium orthosilicate and carbon dioxide is excluded; and heating means disposed around the outer circumference of the reaction vessel for supplying heat to the reaction vessel.

DETAILED DESCRIPTION OF THE INVENTION

Figure 1:
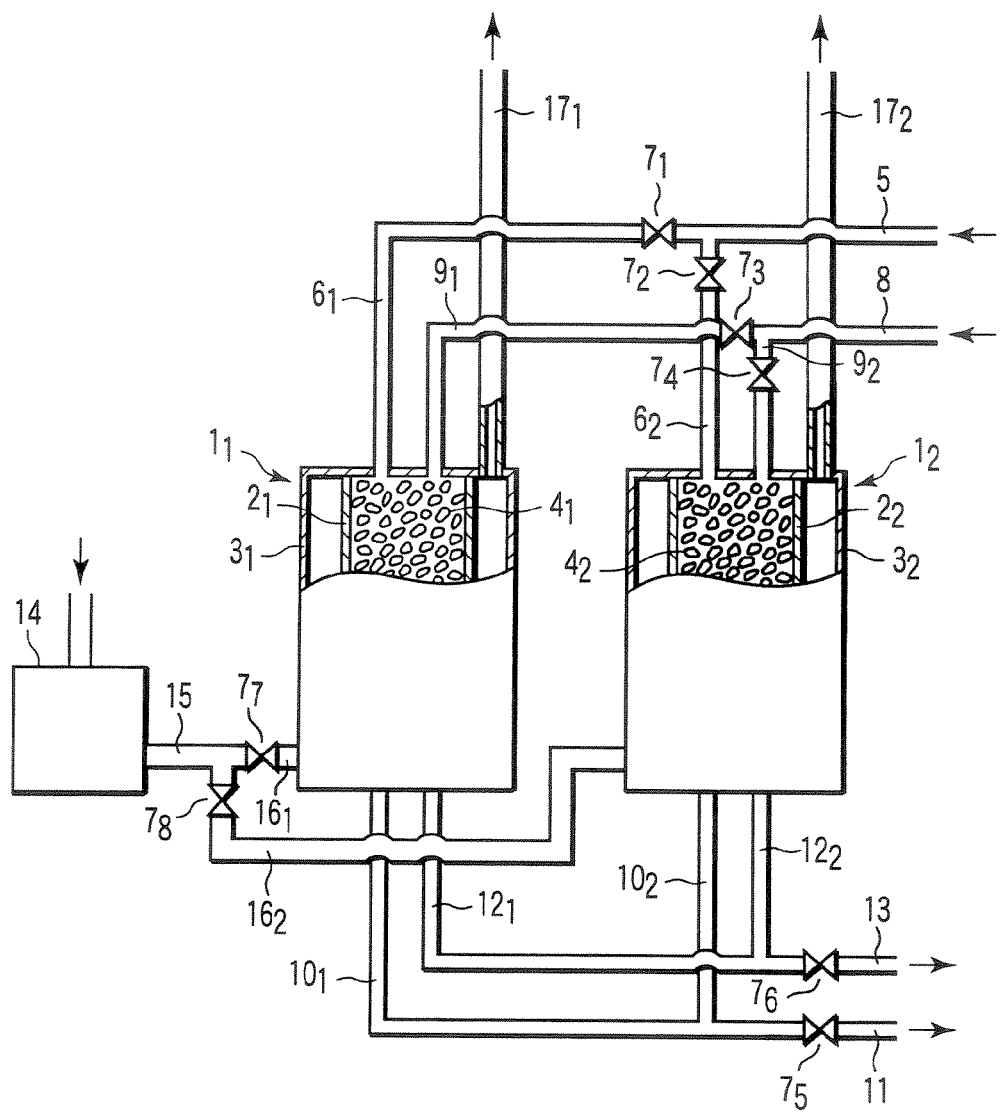
FIG. 1 is a conceptual view showing a carbon dioxide separating apparatus according to an embodiment.

In the following, a carbon dioxide absorbent according to an embodiment of the present invention will be described in detail.

The carbon dioxide absorbent of the embodiment comprises lithium silicate containing lithium orthosilicate and lithium metasilicate. The lithium metasilicate is contained in an amount of 5% by weight or more to 40% by weight or less with respect to the total amount of lithium orthosilicate and lithium metasilicate. Where the lithium metasilicate produced by reaction of the lithium orthosilicate and carbon dioxide is excluded.

The lithium orthosilicate participates exclusively in absorption of carbon dioxide. The lithium orthosilicate causes the absorption reaction expressed by the following formula (3) with carbon dioxide to effect the regenerating reaction expressed by the following formula (4).

Lithium orthosilicate

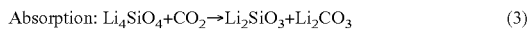

Absorption: $Li_4SiO_4 + CO_2 \rightarrow Li_2SiO_3 + Li_2CO_3$ (3)

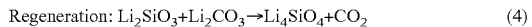

Regeneration: $Li_2SiO_3 + Li_2CO_3 \rightarrow Li_4SiO_4 + CO_2$ (4)

When the lithium orthosilicate is heated in an absorption temperature range of room temperature to around 700° C. (first temperature), the lithium orthosilicate absorbs carbon dioxide in accordance with the reaction expressed by the formula (3), whereby lithium metasilicate ($Li_2SiO_3$) and lithium carbonate ($Li_2CO_3$) are produced. However, the absorption of carbon dioxide expressed by the formula (3) is conducted by heating lithium silicate at a temperature at which lithium metasilicate functioning as an auxiliary agent does not react with carbon dioxide, e.g., a temperature of about 300° C. to 700° C. When the carbon dioxide absorbent which has absorbed carbon dioxide is heated at a temperature exceeding the above-mentioned absorption temperature range (second temperature), it releases the carbon dioxide in accordance with the reaction expressed by the formula (4), whereby it is regenerated to the initial lithium orthosilicate. Such reactions of the carbon dioxide absorption of the carbon dioxide absorbent and the regeneration of the carbon dioxide absorbent can be repeated. The absorption temperature range of carbon dioxide varies depending on the carbon dioxide concentration under the reaction environment, so that the upper limit temperature of the absorption temperature range increases with the increase in carbon dioxide concentration.

In the carbon dioxide absorbent according to the embodiment, the lithium metasilicate functioning as the auxiliary agent does not include the lithium metasilicate produced by the reaction of the lithium orthosilicate and carbon dioxide. Namely, lithium metasilicate ($Li_2SiO_3$) is produced together with lithium carbonate ($Li_2CO_3$) in equivalent mole (molar ratio 1) in the process in which lithium orthosilicate reacts with carbon dioxide to absorb it as in the formula (3). In this case, an amount of lithium metasilicate to be included as the auxiliary agent corresponds to that which is obtained by subtracting the lithium metasilicate produced in the reaction process from the total lithium metasilicate. More specifically, a molar ratio of $Li_2SiO_3/Li_2CO_3$ exceeds 1 when based on the coexistent lithium carbonate ($Li_2CO_3$), and a molar ratio of the excess the lithium metasilicate corresponds to an amount of the lithium metasilicate to be included as the auxiliary agent. Accordingly, the carbon dioxide absorbent according to the embodiment in the process in which lithium orthosilicate reacts with carbon dioxide has a composition in which a molar ratio of the $Li_2SiO_3/Li_2CO_3$ exceeds 1.

When an amount of lithium metasilicate as the auxiliary agent is made less than 5% by weight with respect to the total amount of lithium orthosilicate and lithium metasilicate, it becomes difficult to increase the absorption rate of carbon dioxide having a low concentration. Specifically, in the case where a carbon dioxide absorbent is a porous material as mentioned hereinafter, when an amount of the lithium metasilicate is less than 5% by weight, it makes difficult to increase the pore surface area, so that there is a risk of decreasing the absorption rate of carbon dioxide having a low concentration.

Herein, the expression "carbon dioxide having a low concentration" means that the carbon dioxide concentration in a gas to be processed is 20% or less. On the other hand, when an amount of lithium metasilicate exceeds 40% by weight with respect to the total amount of lithium orthosilicate and lithium metasilicate, not only improving the effect of absorption rate by means of lithium metasilicate saturates, but also there is a risk of decreasing the ratio of lithium orthosilicate in a carbon dioxide absorbent, whereby the absorption amount of carbon dioxide decreases. A preferred amount of lithium metasilicate with respect to the total amount of lithium orthosilicate and lithium metasilicate is 10% to 30% by weight, and most preferably 10% to 26% by weight.

The carbon dioxide absorbent according to the embodiment is allowed to further contained, for example, at least one alkali-based compound selected from the group consisting of alkali carbonates, alkaline earth carbonates, and alkali halides. The alkali-based compounds have such an effect that the solid lithium carbonate, produced on the surface of a carbon dioxide absorbent due to the absorption of carbon dioxide by lithium orthosilicate, is allowed to be a liquid phase, whereby a diffusion velocity of carbon dioxide increases with respect to the surface of the carbon dioxide absorbent, so that the absorption rate of carbon dioxide having a low concentration is further promoted.

Examples of the alkali carbonates include potassium carbonate, sodium carbonate and the like. Examples of the alkaline earth carbonates include calcium carbonate, strontium carbonate, barium carbonate and the like. Examples of the alkali halides include lithium chloride, lithium fluoride, potassium chloride, sodium chloride and the like.

An amount of alkali-based compounds is preferably 0.5 to 20 mol % with respect to the total amount of lithium orthosilicate, lithium metasilicate and alkali-based compound.

When an amount of alkali-based compound is less than 0.5 mol %, it becomes difficult to sufficiently exert the effect of increasing absorption characteristics of carbon dioxide due to containing the alkali-based compound. On the other hand, when an amount of the alkali-based compound exceeds 20 mol %, not only the effect of increasing absorption characteristics of carbon dioxide by means of an alkali-based compound saturates, but also the ratio of lithium orthosilicate in a carbon dioxide absorbent decreases so that the absorption amount or absorption rate of carbon dioxide decreases.

Furthermore, it is preferred that a molar ratio of lithium metasilicate with respect to the alkali-based compound (alkali-based compound/lithium metasilicate) is 0.04 to 0.35. As a result of such definition of a molar ratio, it becomes possible to obtain a carbon dioxide absorbent having a higher absorption rate of carbon dioxide at low concentration.

Specifically, when an amount of alkali-based compound and the molar ratio of lithium metasilicate with respect to the alkali-based compound are defined, it becomes possible to obtain a carbon dioxide absorbent having a higher absorption rate of carbon dioxide at low concentration.

It is preferable to make the carbon dioxide absorbent according to the embodiment be a porous material such as a porous pellet and a porous honeycomb structure. Since such porous material is highly circulative so that the contact area with carbon dioxide becomes extensive, whereby it becomes possible to further improve the absorption rate of carbon dioxide at low concentration. It is preferred that the porous material has, for example, a porosity of 30 to 75%. The porous material may be molded by means of compression molding, granulation, extrusion and the like.

Such porous carbon dioxide absorbent may be manufactured in accordance with, for example, the following manner.

First, silicon dioxide, lithium carbonate, and sodium carbonate are weighed so as to have a molar ratio of 14.8:24.4:1; and the mixture is blended in an agate mortar or the like for 0.1 to 1 hour. The resulting mixed powder is placed in an alumina crucible and heat-treated in a box type electric furnace under the atmosphere for about 0.5 to 20 hours, whereby a mixed powder containing lithium orthosilicate, lithium metasilicate, and sodium carbonate is obtained. Subsequently, a given amount of the powder is weighed; a metal mold is filled therewith, and subjected to compression molding, whereby a carbon dioxide absorbent having a porous structure is manufactured.

In the absorption of carbon dioxide in a gas containing carbon dioxide at low concentration due to the carbon dioxide absorbent according to the embodiment, it is preferred that the moisture content of the gas is 20% to 75% in order to improve the absorption rate of carbon dioxide.

The carbon dioxide absorbent according to the embodiment as described above can improve the absorption rate of carbon dioxide at low concentration.

Namely, the absorption rate of carbon dioxide is low in a carbon dioxide absorbent composed only of lithium orthosilicate, so that a sufficient rate cannot be obtained. For this reason, it is usually conducted to add an alkali carbonate such as potassium carbonate and sodium carbonate to lithium orthosilicate, whereby the absorption performance is elevated. However, when a carbon dioxide absorbent composed of lithium orthosilicate to which an alkali carbonate has been added is allowed to absorb carbon dioxide at low concentration, i.e., a gas having a concentration of carbon dioxide of 20% or less, a sufficient absorption rate of carbon dioxide cannot be achieved.

Under the circumstances, when lithium silicate containing lithium orthosilicate and lithium metasilicate is used and the lithium metasilicate is contained in an amount of 5% by weight or more to 40% by weight or less with respect to the total amount of lithium orthosilicate and lithium metasilicate, where the lithium metasilicate produced by reaction of the lithium orthosilicate and carbon dioxide is excluded, a carbon dioxide absorbent which can efficiently absorb carbon dioxide at low concentration can be obtained.

When the carbon dioxide absorbent having such composition as mentioned above has particularly a porous configuration, the pore surface area thereof increases to elevate a contact velocity with carbon dioxide, thereby it becomes possible to further increase the absorption rate of carbon dioxide at low concentration.

Moreover, when the moisture content in a gas containing carbon dioxide at low concentration is 20% to 75%, lithium metasilicate in the carbon dioxide absorbent brings about a catalytic function to promote the absorption rate of carbon dioxide by means of lithium orthosilicate, whereby it becomes possible to further increase the absorption rate of carbon dioxide at low concentration.

Next, a carbon dioxide separating apparatus according to an embodiment of the invention will be described specifically herein below by referring to a schematic sectional view of FIG. 1.

First and second absorption tubes $1_1$ and $1_2$ have double structures composed of inner tubes $2_1$ and $2_2$ and outer tubes $3_1$ and $3_2$, respectively. Herein, each inner tube $2_1$, $2_2$ forms a reaction vessel, and a space formed between each inner tube $2_1$, $2_2$ and each outer tube $3_1$, $3_2$ provided at the circumference thereof is a space to which, for example, heat as heating means is supplied. Carbon dioxide absorbents $4_1$, $4_2$, each of which comprises the above-mentioned lithium silicate containing lithium orthosilicate and lithium metasilicate and the lithium metasilicate being contained in an amount of 5% by weight or more to 40% by weight or less with respect to the total amount of lithium orthosilicate and lithium metasilicate, where the lithium metasilicate produced by reaction of the lithium orthosilicate and carbon dioxide is excluded, are filled in the reaction containers, respectively. First and second carbon dioxide-containing gas supply branch pipes $6_1$ and $6_2$ branched from a carbon dioxide-containing gas supply pipe 5 are connected to the upper parts of the reaction vessels, respectively. First and second valves $7_1$ and $7_2$ are interjacent the first and second gas supply branch pipes $6_1$ and $6_2$, respectively.

First and second gas supply branch pipes $9_1$ and $9_2$ branched from a gas supply pipe 8 for recovering carbon dioxide are connected to the top parts of the reaction vessels, respectively. Third and fourth valves $7_3$ and $7_4$ are interposed the first and second gas supply branch pipes $9_1$ and $9_2$, respectively.

First and second gas exhaust branch pipes $10_1$ and $10_2$ are connected to the bottom parts of the reaction vessels, respectively, while the other ends of the branch pipes $10_1$ and $10_2$ are connected to a processed gas discharge pipe 11, respectively. A fifth valve $7_5$ is mounted on the discharge pipe 11. First and second recovery gas exhaust branch pipes $12_1$ and $12_2$ are connected to the bottom parts of the reaction vessels, respectively, while the other ends of the branch pipes $12_1$ and $12_2$ are connected to a recovery gas discharge pipe 13, respectively. A sixth valve $7_6$ is mounted on the recovery gas discharge pipe 13.

A combustion chamber 14 for burning a fuel gas is disposed adjacent to the first absorption tube $1_1$. First and second combustion gas supply branch pipes $16_1$ and $16_2$ branched from a combustion gas supply pipe 15, one end of which is connected to the combustion chamber 14, are connected to the lower side surfaces of the heating means, respectively. Seventh and eighth valves $7_7$ and $7_8$ are mounted on the first and second combustion gas supply branch pipes $16_1$ and $16_2$, respectively. First and second discharge pipes $17_1$ and $17_2$ are connected to the heating means, respectively, so as to communicate therewith. When a fuel gas is introduced into the combustion chamber 14, the combustion gas burned therein is supplied to the heating means through the combustion gas supply pipe 15 as well as the first and the second supply branch pipes $16_1$ and $16_2$, respectively; and it is circulated through these spaces to be exhausted from the first and the second discharge pipes $17_1$ and $17_2$. The carbon dioxide absorbents $4_1$ and $4_2$ filled in the reaction vessels are heated, respectively, while the combustion gas is circulated through the spaces.

It is preferred to set a circulating number of moles per hour of the gas circulating through the respective reaction vessels to a value of about four to fifty times with respect to the number of moles of the carbon dioxide absorbents $4_1$ and $4_2$. When the circulating number of moles per hour of the gas exceeds about fifty times, it is difficult to efficiently conduct carbon dioxide absorption from the viewpoint of a volumetric capacity utility factor of the reaction vessel. On the other hand, when the circulating number of moles per hour of the gas is less than about four times, the calorific power accompanied by absorption reaction becomes excessive, so that there is such a fear that the absorption reaction itself is obstructed because of the temperature rise of the passing gas. From the viewpoint of both efficiency of utilization of the absorption tube and prompt progress of the absorption reaction, it is more preferable that the circulating number of moles per hour of the gas is about eight to thirty times.

In the two reaction vessels storing the carbon dioxide absorbents $4_1$ and $4_2$ respectively, carbon dioxide absorption reaction and carbon dioxide releasing reaction are alternately conducted in accordance with the following procedures (1-1) and (1-2) to continuously carry out the absorption and recovery of carbon dioxide.

(1-1) Absorption Operation of Carbon Dioxide in the First Absorption Tube $1_1$

First, the first valve $7_1$ mounted on the first branch tube $6_1$ connected to the inner tube $2_1$ of the first absorption tube $1_1$ (the first reaction vessel) and the fifth valve $7_5$ mounted on the processed gas discharge pipe 11 are opened respectively, while the other valves $7_2$, $7_3$, $7_4$, $7_6$, $7_7$, and $7_8$ are closed. A combustion gas from the combustion chamber 14 is circulated in the annular space (first heating means) formed by the inner tube $2_1$ and the outer tube $3_1$ through the combustion gas supply pipe 15 and the first combustion gas supply branch pipe $16_1$, whereby the carbon dioxide absorbent $4_1$ filled in the inner tube $2_1$ of the first absorption tube $1_1$ (the first reaction vessel) is heated to 300° C. to 700° C. A gas containing carbon dioxide at low concentration, e.g., 20% or less is supplied from the carbon dioxide-containing gas supply pipe 5 to the first reaction vessel through the first branch pipe $6_1$. In this case, it is preferred that the above-described gas has a moisture content of 20% to 75% for the reason mentioned before. In addition, since the circulating number of moles per hour of the gas in the first reaction vessel is set to about four to fifty times with respect to the number of moles filled in the carbon dioxide absorbent, the carbon dioxide contained in the gas is promptly absorbed by the carbon dioxide absorbent $4_1$ and maintained therein. The gas in which the carbon dioxide concentration is reduced is discharged through the first gas branch pipe $10_1$ and the processed gas discharge pipe 11.

Carbon dioxide absorption in the second absorption tube $1_2$ is conducted by the same operation.

(1-2) Operation for Recovering Carbon Dioxide from the Second Absorption Tube $1_2$ During the operation of the carbon dioxide absorption in the first absorption tube $1_1$ explained in the paragraph (1-1), the fourth valve $7_4$ mounted on the second branch pipe $9_2$ connected to the second absorption tube $1_2$, the sixth valve $7_6$ mounted on the recovery gas discharge pipe 13, and the eighth valve $7_8$ mounted on the second combustion gas supply branch pipe $16_2$ are opened respectively. Thereafter, when the combustion gas from the combustion chamber 14 is circulated into an annular space (second heating means) formed by the inner tube $2_2$ and the outer tube $3_2$ through the combustion gas supply pipe 15 and the second combustion gas supply branch pipe $16_2$, the carbon dioxide absorbent $4_2$ filled inside the inner tube $2_2$ (second reaction vessel) of the second absorption tube $1_2$ is heated at about 800° C. or more. At the same time, a desired gas to be recovered is supplied from the recovery gas supply pipe 8 to the second reaction vessel through the second branch pipe $9_2$. In this case, the carbon dioxide which has been already absorbed by the carbon dioxide absorbent $4_2$ is rapidly released as a result of a carbon dioxide releasing reaction, so that a gas containing carbon dioxide at high concentration is recovered through a second recovery gas discharge branch pipe $12_2$ and the recovery gas discharge pipe 13.

The recovery of carbon dioxide from the first absorption tube $1_1$ is carried out in the same manner as that described above.

As mentioned above, when the carbon dioxide absorption operation is implemented in the first absorption tube $1_1$, the recovery operation of the carbon dioxide from the second absorption tube $1_2$ is carried out at the same time, while when the recovery operation of the carbon dioxide from the first absorption tube $1_1$ is conducted, the carbon dioxide absorption operation is implemented in the second absorption tube $1_2$ at the same time. These operations are alternately repeated, whereby continuous separation/recovery of carbon dioxide can be realized.

The inner tubes $2_1$ and $2_2$, the outer tubes $3_1$ and $3_2$, the carbon dioxide-containing gas supply branch pipes $6_1$ and $6_2$, the recovery gas supply branch pipes $9_1$ and $9_2$, the gas exhaust branch pipes $10_1$ and $10_2$, and the recovery gas exhaust branch pipes $12_1$ and $12_2$ do not particularly depend on the types of materials therefor; and in this case, for instance, compact bone alumina, or metals such as nickel, and iron may be used. Moreover, when a longer contact time of a combustion gas with the carbon dioxide absorbents $4_1$ and $4_2$ is taken into consideration, it is preferred that the reaction vessel has a long tubular shape in the direction along which the gas circulates.

Furthermore, in order to achieve such a temperature control that an internal temperature of the reaction vessel is established to a predetermined temperature dependent on the reaction temperature of a raw material gas as occasion demands, temperature controlling means such as a heater may be provided inside or outside the reaction vessel.

As mentioned above, it becomes possible to continuously separate/recover carbon dioxide by a simplified structure at a low cost in accordance with the carbon dioxide separating apparatus of the present embodiment.

Next, the reformer according to an embodiment will be described.

The reformer comprises a reaction vessel provided with an introduction pipe for introducing a raw material gas containing carbon and steam, and a discharge pipe for discharging a produced gas; a solid catalyst stored in the reaction vessel for promoting a reforming reaction; a carbon dioxide absorbent stored in the reaction vessel, including lithium silicate containing lithium orthosilicate and lithium metasilicate, and the lithium metasilicate being contained in an amount of 5% by weight or more to 40% by weight or less with respect to the total amount of lithium orthosilicate and lithium metasilicate, where the lithium metasilicate produced by reaction of the lithium orthosilicate and carbon dioxide is excluded; and heating means disposed on the outer circumference of the reaction vessel to supply heat to the reaction vessel.

Examples of the raw material gas containing carbon include methane, natural gas, and CO.

Examples of the solid catalyst include the one prepared by supporting a catalyst metal such as nickel, ruthenium, and rhodium on an alumina carrier.

It is preferred that a filling ratio of the solid catalyst and the carbon dioxide absorbent is 1:1 to 1:8 in weight ratio.

In the following, the reformer according to the embodiment will be described specifically by referring to the schematic view of FIG. 2.

A reaction vessel 21 is provided with a gas introduction pipe 22 and a produced gas discharge pipe 23. The reaction vessel 21 is filled with a solid catalyst 24 promoting the reforming reaction and a carbon dioxide absorbent 25 having the above-mentioned composition. Heating means such as a heater 26 is disposed on the upper and the lower sides of the reaction vessel 21.

Figure 2:
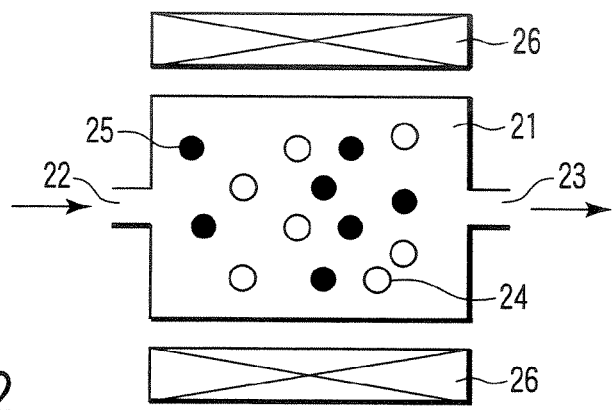
FIG. 2 is a schematic view showing a reforming reaction device according to an embodiment.

In the reformer as shown in FIG. 2, the reaction vessel 21 is filled with the solid catalyst 24 for promoting reforming reaction and the carbon dioxide absorbent 25 in a desired ratio, and then, a mixed gas of a raw material gas containing carbon (e.g., methane) and steam is supplied into the reaction vessel 21 at a temperature of 500 to 650° C. through the gas introduction pipe 22. In this case, the steam reforming reaction expressed by the formula (1) proceeds in the presence of the solid catalyst to produce hydrogen, and further to produce a by-product carbon dioxide. The by-product carbon dioxide reacts with the lithium orthosilicate filled in the reaction vessel 21 being the reforming reaction field in accordance with the reaction expressed by the formula (2), so that the carbon dioxide is absorbed in the form of lithium carbonate and removed from the reaction field. When the by-product carbon dioxide in the reforming reaction field is removed, the chemical equilibrium expressed by the formula (1) shifts to the side of hydrogen production, whereby it becomes possible to recover a hydrogen-rich produced gas through the produced gas discharge pipe 22.

On the other hand, in the case where absorption of carbon dioxide due to the carbon dioxide absorbent 25 reaches the saturation state, heating the carbon dioxide absorbent 25 by the heater 26 to a temperature exceeding 700° C. (e.g., 850° C.) makes it possible to release carbon dioxide to regenerate the absorbent as expressed by the formula (4).

According to the reformer of the embodiment as described above, when the reaction vessel, into which a raw material gas containing carbon and steam are introduced, is filled with a solid catalyst for promoting the reforming reaction and a carbon dioxide absorbent including lithium silicate containing lithium orthosilicate and a specified amount of lithium metasilicate, a by-product carbon dioxide produced together with a main produced gas hydrogen in the reforming reaction field can be removed efficiently to promote the producing reaction of hydrogen. Specifically, since the reforming reaction field contains a moisture of 75% at the maximum and it is in such a condition that the lithium metasilicate of the carbon dioxide absorbent performs a catalytic function for promoting the absorption rate of carbon dioxide by means of lithium orthosilicate, the by-product carbon dioxide can be efficiently removed to promote the producing reaction of hydrogen. As a result, it becomes possible to efficiently produce hydrogen at high concentration.

In the following, Examples of the present invention will be described.

EXAMPLE 1

A silicon dioxide powder having 0.8 μm average particle diameter and a lithium carbonate powder having 1 μm average particle diameter were prepared in such an amount in which lithium carbonate:silicon dioxide is 2.38:1 in weight ratio, and they were dry blended by using an agate mortar. Subsequently, the raw material mixed powder was processed at 1000° C. for 8 hours in the atmosphere by means of a box type electric furnace to obtain a powder principally containing lithium orthosilicate. The powder obtained was 165.1: 8.98 in a weight ratio of lithium orthosilicate and lithium metasilicate, and an amount of the lithium metasilicate with respect to the total amount of lithium orthosilicate and lithium metasilicate was 5.2% by weight. The powder was charged into an extruding machine, and a porous carbon dioxide absorbent composed of a columnar (5 mm outer diameter) having a porosity of 63% was fabricated in accordance with an extrusion method.

EXAMPLE 2

A silicon dioxide powder having 0.8 μm average particle diameter and a lithium carbonate powder having 1 μm average particle diameter were prepared in such an amount in which lithium carbonate:silicon dioxide is 1.32:1 in weight ratio, and they were dry blended by using an agate mortar. Subsequently, the raw material mixed powder was processed at 1000° C. for 8 hours in the atmosphere by means of a box type electric furnace to obtain a powder principally containing lithium orthosilicate. The powder obtained was 157.4:18 in a weight ratio of lithium orthosilicate and lithium metasilicate, and an amount of the lithium metasilicate with respect to the total amount of lithium orthosilicate and lithium metasilicate was 10% by weight. The powder was charged into an extruding machine, and a porous carbon dioxide absorbent composed of a columnar (5 mm outer diameter) having a porosity of 64% was fabricated in accordance with an extrusion method.

EXAMPLE 3

A silicon dioxide powder having 0.8 μm average particle diameter and a lithium carbonate powder having 1 μm average particle diameter were prepared in such an amount in which lithium carbonate:silicon dioxide is 2.08:1 in weight ratio, and they were dry blended by using an agate mortar. Subsequently, the raw material mixed powder was processed at 1000° C. for 8 hours in the atmosphere by means of a box type electric furnace to obtain a powder principally containing lithium orthosilicate. The powder obtained was 134.3:44.9 in a weight ratio of lithium orthosilicate and lithium metasilicate, and an amount of the lithium metasilicate with respect to the total amount of lithium orthosilicate and lithium metasilicate was 25.1% by weight. The powder was charged into an extruding machine, and a porous carbon dioxide absorbent composed of a columnar (5 mm outer diameter) having a porosity of 63.8% was fabricated in accordance with an extrusion method.

EXAMPLE 4

A silicon dioxide powder having 0.8 μm average particle diameter and a lithium carbonate powder having 1 μm average particle diameter were prepared in such an amount in which lithium carbonate:silicon dioxide is 1.88:1 in weight ratio, and they were dry blended by using an agate mortar. Subsequently, the raw material mixed powder was processed at 1000° C. for 8 hours in the atmosphere by means of a box type electric furnace to obtain a powder principally containing lithium orthosilicate. The powder obtained was 109.9:73.3 in a weight ratio of lithium orthosilicate and lithium metasilicate, and an amount of the lithium metasilicate with respect to the total amount of lithium orthosilicate and lithium metasilicate was 40% by weight. The powder was charged into an extruding machine, and a porous carbon dioxide absorbent composed of a columnar (5 mm outer diameter) having a porosity of 62% was fabricated in accordance with an extrusion method.

COMPARATIVE EXAMPLE 1

A silicon dioxide powder having 0.8 μm average particle diameter and a lithium carbonate powder having 1 μm average particle diameter were prepared in such an amount in which lithium carbonate:silicon dioxide is 2.46:1 in weight ratio, and they were dry blended by using an agate mortar. Subsequently, the raw material mixed powder was processed at 1000° C. for 8 hours in the atmosphere by means of a box type electric furnace to obtain a powder principally containing lithium orthosilicate. The powder obtained was 172.8:0 in a weight ratio of lithium orthosilicate and lithium metasilicate, and an amount of the lithium metasilicate with respect to the total amount of lithium orthosilicate and lithium metasilicate was 0% by weight. The powder was charged into an extruding machine, and a porous carbon dioxide absorbent composed of a columnar (5 mm outer diameter) having a porosity of 60.5% was fabricated in accordance with an extrusion method.

COMPARATIVE EXAMPLE 2

A silicon dioxide powder having 0.8 μm average particle diameter and a lithium carbonate powder having 1 μm average particle diameter were prepared in such an amount in which lithium carbonate:silicon dioxide is 2.39:1 in weight ratio, and they were dry blended by using an agate mortar. Subsequently, the raw material mixed powder was processed at 1000° C. for 8 hours in the atmosphere by means of a box type electric furnace to obtain a powder principally containing lithium orthosilicate. The powder obtained was 166.4:7.48 in a weight ratio of lithium orthosilicate and lithium metasilicate, and an amount of the lithium metasilicate with respect to the total amount of lithium orthosilicate and lithium metasilicate was 4.3% by weight. The powder was charged into an extruding machine, and a porous carbon dioxide absorbent composed of a columnar (5 mm outer diameter) having a porosity of 61.5% was fabricated in accordance with an extrusion method.

COMPARATIVE EXAMPLE 3

A silicon dioxide powder having 0.8 μm average particle diameter and a lithium carbonate powder having 1 μm average particle diameter were prepared in such an amount in which lithium carbonate:silicon dioxide is 1.78:1 in weight ratio, and they were dry blended by using an agate mortar. Subsequently, the raw material mixed powder was processed at 1000° C. for 8 hours in the atmosphere by means of a box type electric furnace to obtain a powder principally containing lithium orthosilicate. The powder obtained was 95.7:89.8 in a weight ratio of lithium orthosilicate and lithium metasilicate, and an amount of the lithium metasilicate with respect to the total amount of lithium orthosilicate and lithium metasilicate was 48.4% by weight. The powder was charged into an extruding machine, and a porous carbon dioxide absorbent composed of a columnar (5 mm outer diameter) having a porosity of 60% was fabricated in accordance with an extrusion method.

COMPARATIVE EXAMPLE 4

A silicon dioxide powder having 0.8 μm average particle diameter and a lithium carbonate powder having 1 μm average particle diameter were prepared in such an amount in which lithium carbonate:silicon dioxide is 2.46:1 in weight ratio, and they were dry blended by using an agate mortar. Subsequently, the raw material mixed powder was processed at 1000° C. for 8 hours in the atmosphere by means of a box type electric furnace to obtain a powder containing only lithium orthosilicate. Then, the resulting powder was allowed to stand for 15 minutes at 500° C. in carbon dioxide atmosphere thereby to react a part of the lithium orthosilicate with carbon dioxide, and then, the resulting product was transferred to an argon atmosphere. In the powder obtained, an amount of the lithium metasilicate with respect to the total amount of lithium orthosilicate and lithium metasilicate was 24.8% by weight; and the resulting powder had a composition containing equivalent moles of lithium carbonate and lithium metasilicate produced in the reaction of carbon dioxide. The powder was charged into an extruding machine, and a porous carbon dioxide absorbent composed of a columnar (5 mm outer diameter) having a porosity of 61% was fabricated in accordance with an extrusion method.

With respect to the porous carbon dioxide absorbents obtained in Examples 1 to 4 and the Comparative Examples 1 to 4, repeated carbon dioxide absorption and release performance was evaluated. Namely, $CO_2$ absorption performance of these carbon dioxide absorbents was measured by using a thermogravimetric analyzer (TG). The $CO_2$ absorption was made by maintaining each material under the circulation of 2.5% $CO_2$/50% $H_2O$ gas (1 atmospheric pressure-300 mL/minute) at 600° C. for 1 hour. With respect to the absorption rate, a weight increasing rate (% by weight/time) was made to be the index in the case of maintaining each material at 600° C. for 60 minutes. The results thereof are indicated in the following Table 1.

TABLE 1

|  | Amount of lithium metasilicate (wt %) | $CO_2$ absorption rate (wt %/hr) |
|---|---|---|
| Example 1 | 5.2 | 10.1 |
| Example 2 | 10 | 12.3 |
| Example 3 | 25.1 | 13.3 |
| Example 4 | 40 | 10.1 |
| Comparative Example 1 | 0 | 4 |
| Comparative Example 2 | 4.3 | 8 |
| Comparative Example 3 | 48.4 | 7.7 |
| Comparative Example 4 | 24.8 | 3.6 |

As is apparent from Table 1, it has been found that each of the carbon dioxide absorbents, obtained in Examples 1 to 4, composed of lithium orthosilicate and lithium metasilicate, the lithium metasilicate being contained in the range of 5% to 40% by weight with respect to the total amount of the lithium orthosilicate and the lithium metasilicate, exhibits a high $CO_2$ absorption rate compared with that of each of the carbon dioxide absorbents, obtained in the Comparative Examples 1 to 3, in which the ratio of including lithium metasilicate is out of the above-described range. As a result, it has been found that such a carbon dioxide absorbent including the lithium metasilicate to be added as the auxiliary agent in the range of 5% to 40% by weight exhibits a high absorption rate of carbon dioxide at low concentration.

Furthermore, it has been found that even when lithium metasilicate is within the range of 5% to 40% by weight, the carbon dioxide absorbent of the Comparative Example 4 in which the lithium metasilicate is derived from the reaction of lithium orthosilicate and carbon dioxide exhibits a low absorption rate of carbon dioxide at low concentration as in the case of the carbon dioxide absorbents obtained in the Comparative Examples 1 to 3.

EXAMPLE 5

A silicon dioxide powder having 0.8 μm average particle diameter, a lithium carbonate powder having 1 μm average particle diameter, and a sodium carbonate powder having 1 μm average particle diameter were prepared in such an amount in which lithium carbonate:silicon dioxide:sodium carbonate is 2.3:1:0.011 in weight ratio, and they were dry blended by using an agate mortar. Subsequently, the raw material mixed powder was processed at 1000° C. for 8 hours in the atmosphere by means of a box type electric furnace to obtain a powder principally containing lithium orthosilicate. The powder obtained was 157.7:17.7 in a weight ratio of lithium orthosilicate and lithium metasilicate, and an amount of the lithium metasilicate with respect to the total amount of lithium orthosilicate and lithium metasilicate was 10.1% by weight. Moreover, in the resulting powder, an amount of sodium carbonate with respect to the total amount of all the components was 0.62 mol %, and a molar ratio of sodium carbonate and lithium metasilicate (sodium carbonate/lithium metasilicate) was 0.047. The powder was charged into an extruding machine, and a porous carbon dioxide absorbent composed of a columnar (5 mm outer diameter) having a porosity of 65.2% was fabricated in accordance with an extrusion method.

EXAMPLE 6

A silicon dioxide powder having 0.8 μm average particle diameter, a lithium carbonate powder having 1 μm average particle diameter, and a sodium carbonate powder having 1 μm average particle diameter were prepared in such an amount in which lithium carbonate:silicon dioxide:sodium carbonate is 2.3:1:0.055 in weight ratio, and they were dry blended by using an agate mortar. Subsequently, the raw material mixed powder was processed at 1000° C. for 8 hours in the atmosphere by means of a box type electric furnace to obtain a powder principally containing lithium orthosilicate. The powder obtained was 157.7:17.7 in a weight ratio of lithium orthosilicate and lithium metasilicate, and an amount of the lithium metasilicate with respect to the total amount of lithium orthosilicate and lithium metasilicate was 10.1% by weight. Moreover, in the resulting powder, an amount of sodium carbonate with respect to the total amount of all the components was 3.01 mol %, and a molar ratio of sodium carbonate and lithium metasilicate (sodium carbonate/lithium metasilicate) was 0.24. The powder was charged into an extruding machine, and a porous carbon dioxide absorbent composed of a columnar (5 mm outer diameter) having a porosity of 65.5% was fabricated in accordance with an extrusion method.

EXAMPLE 7

A silicon dioxide powder having 0.8 μm average particle diameter, a lithium carbonate powder having 1 μm average particle diameter, and a sodium carbonate powder having 1 μm average particle diameter were prepared in such an amount in which lithium carbonate:silicon dioxide:sodium carbonate is 2.3:1:0.082 in weight ratio, and they were dry blended by using an agate mortar. Subsequently, the raw material mixed powder was processed at 1000° C. for 8 hours in the atmosphere by means of a box type electric furnace to obtain a powder principally containing lithium orthosilicate. The powder obtained was 157.7:17.7 in a weight ratio of lithium orthosilicate and lithium metasilicate, and an amount of the lithium metasilicate with respect to the total amount of lithium orthosilicate and lithium metasilicate was 10.1% by weight. Moreover, in the resulting powder, an amount of sodium carbonate with respect to the total amount of all the components was 4.44 mol %, and a molar ratio of sodium carbonate and lithium metasilicate (sodium carbonate/lithium metasilicate) was 0.35. The powder was charged into an extruding machine, and a porous carbon dioxide absorbent composed of a columnar (5 mm outer diameter) having a porosity of 65.1% was fabricated in accordance with an extrusion method.

EXAMPLE 8

A silicon dioxide powder having 0.8 μm average particle diameter, a lithium carbonate powder having 1 μm average particle diameter, and a sodium carbonate powder having 1 μm average particle diameter were prepared in such an amount in which lithium carbonate:silicon dioxide:sodium carbonate is 2.2:1:0.011 in weight ratio, and they were dry blended by using an agate mortar. Subsequently, the raw material mixed powder was processed at 1000° C. for 8 hours in the atmosphere by means of a box type electric furnace to obtain a powder principally containing lithium orthosilicate. The powder obtained was 147.4:29.6 in a weight ratio of lithium orthosilicate and lithium metasilicate, and an amount of the lithium metasilicate with respect to the total amount of lithium orthosilicate and lithium metasilicate was 16.7% by weight. Moreover, in the resulting powder, an amount of sodium carbonate with respect to the total amount of all the components was 0.62 mol %, and a molar ratio of sodium carbonate and lithium metasilicate (sodium carbonate/lithium metasilicate) was 0.029. The powder was charged into an extruding machine, and a porous carbon dioxide absorbent composed of a columnar (5 mm outer diameter) having a porosity of 61.4% was fabricated in accordance with an extrusion method.

EXAMPLE 9

A silicon dioxide powder having 0.8 μm average particle diameter, a lithium carbonate powder having 1 μm average particle diameter, and a sodium carbonate powder having 1 μm average particle diameter were prepared in such an amount in which lithium carbonate:silicon dioxide:sodium carbonate is 2.4:1:0.008 in weight ratio, and they were dry blended by using an agate mortar. Subsequently, the raw material mixed powder was processed at 1000° C. for 8 hours in the atmosphere by means of a box type electric furnace to obtain a powder principally containing lithium orthosilicate. The powder obtained was 161.5:13.2 in a weight ratio of lithium orthosilicate and lithium metasilicate, and an amount of the lithium metasilicate with respect to the total amount of lithium orthosilicate and lithium metasilicate was 10.1% by weight. Moreover, in the resulting powder, an amount of sodium carbonate with respect to the total amount of all the components was 0.45 mol %, and a molar ratio of sodium carbonate and lithium metasilicate (sodium carbonate/lithium metasilicate) was 0.046. The powder was charged into an extruding machine, and a porous carbon dioxide absorbent composed of a columnar (5 mm outer diameter) having a porosity of 61.7% was fabricated in accordance with an extrusion method.

EXAMPLE 10

A silicon dioxide powder having 0.8 μm average particle diameter, a lithium carbonate powder having 1 μm average particle diameter, and a sodium carbonate powder having 1 μm average particle diameter were prepared in such an amount in which lithium carbonate:silicon dioxide:sodium carbonate is 2.3:1:0.11 in weight ratio, and they were dry blended by using an agate mortar. Subsequently, the raw material mixed powder was processed at 1000° C. for 8 hours in the atmosphere by means of a box type electric furnace to obtain a powder principally containing lithium orthosilicate. The powder obtained was 157.7:17.7 in a weight ratio of lithium orthosilicate and lithium metasilicate, and an amount of the lithium metasilicate with respect to the total amount of lithium orthosilicate and lithium metasilicate was 10.1% by weight. Moreover, in the resulting powder, an amount of sodium carbonate with respect to the total amount of all the components was 5.9 mol %, and a molar ratio of sodium carbonate and lithium metasilicate (sodium carbonate/lithium metasilicate) was 0.48. The powder was charged into an extruding machine, and a porous carbon dioxide absorbent composed of a columnar (5 mm outer diameter) having a porosity of 60.6% was fabricated in accordance with an extrusion method.

COMPARATIVE EXAMPLE 5

A silicon dioxide powder having 0.8 μm average particle diameter, a lithium carbonate powder having 1 μm average particle diameter, and a sodium carbonate powder having 1 μm average particle diameter were prepared in such an amount in which lithium carbonate silicon dioxide:sodium carbonate is 2.39:1:0.003 in weight ratio, and they were dry blended by using an agate mortar. Subsequently, the raw material mixed powder was processed at 1000° C. for 8 hours in the atmosphere by means of a box type electric furnace to obtain a powder principally containing lithium orthosilicate. The powder obtained was 166.4:7.48 in a weight ratio of lithium orthosilicate and lithium metasilicate, and an amount of the lithium metasilicate with respect to the total amount of lithium orthosilicate and lithium metasilicate was 4.3% by weight. Moreover, in the resulting powder, an amount of sodium carbonate with respect to the total amount of all the components was 0.17 mol %, and a molar ratio of sodium carbonate and lithium metasilicate (sodium carbonate/lithium metasilicate) was 0.03. The powder was charged into an extruding machine, and a porous carbon dioxide absorbent composed of a columnar (5 mm outer diameter) having a porosity of 60.3% was fabricated in accordance with an extrusion method.

With respect to the carbon dioxide absorbents obtained in Examples 5 to 10 and the Comparative Example 5, their absorption rates were evaluated in accordance with the same evaluation method as that of Example 1. The results thereof are indicated in the following Table 2.

TABLE 2

| | Amount of lithium metasilicate (wt %) | Amount of sodium carbonate (mol %) | Sodium carbonate/lithium metasilicate (molar ratio) | $CO_2$ absorption rate (wt %/hr) |
|---|---|---|---|---|
| Example 5 | 10.1 | 0.62 | 0.047 | 21 |
| Example 6 | 10.1 | 3.01 | 0.24 | 23 |
| Example 7 | 10.1 | 4.44 | 0.35 | 21 |
| Example 8 | 16.7 | 0.62 | 0.029 | 10.1 |
| Example 9 | 10.1 | 0.45 | 0.046 | 11.5 |
| Example 10 | 10.1 | 5.9 | 0.48 | 11.1 |
| Comparative Example 5 | 4.3 | 0.17 | 0.03 | 8.2 |

As is apparent from Table 2, it has been found that each of the carbon dioxide absorbents obtained in Examples 5 to 10, composed of lithium orthosilicate, lithium metasilicate and sodium carbonate, the lithium metasilicate being contained in the range of 5% to 40% by weight with respect to the total amount of the lithium orthosilicate and the lithium metasilicate, exhibits a high $CO_2$ absorption rate compared with that of the carbon dioxide absorbent obtained in the Comparative Example 5, composed of lithium orthosilicate, lithium metasilicate and sodium carbonate, the amount of lithium metasilicate being out of the above-described range.

Specifically, it has been found that each of the carbon dioxide absorbents obtained in Examples 5 to 7, which is composed of lithium orthosilicate, lithium metasilicate and sodium carbonate, and in which the lithium metasilicate is contained in the range of 5% to 40% by weight with respect to the total amount of the lithium orthosilicate and the lithium metasilicate; sodium carbonate is 0.5 to 20 mol % with respect to the total amount of all the components; and a molar ratio of sodium carbonate/lithium metasilicate is 0.04 to 0.35, exhibits a higher $CO_2$ absorption rate compared with that of each of the carbon dioxide absorbents obtained in Examples 8 to 10, which is out of the above-described ranges in either of the molar amount of sodium carbonate with respect to the total amount of all the components and the molar ratio of sodium carbonate/lithium metasilicate.

In the above-mentioned Examples 5 to 10, although only the Example in which sodium carbonate was used as a material of alkali carbonates, alkaline earth carbonates, and alkali halides, the same effects can be obtained by other alkali carbonates, alkaline earth carbonates, and alkali halides.

EXAMPLE 11

Hydrogen was produced by using the above-mentioned reformer shown in FIG. 2.

In the reformer shown in FIG. 2, a tubular reaction vessel 21 having 0.05 m inner diameter and 1.2 m length was used. The reaction vessel 21 was filled with a blend prepared from 0.4 kg of solid catalyst 24 and 1.6 kg of a carbon dioxide absorbent 25 granulated to have 10 μm average particle diameter. The solid catalyst consisted of alumina particles having 10 μm average particle diameter supported by about 20% by weight of metallic nickel. The carbon dioxide absorbent 25 was composed of lithium orthosilicate and lithium metasilicate. An amount of the lithium metasilicate with respect to the total amount of lithium orthosilicate and lithium metasilicate was 10% by weight.

Steam was admixed with methane so as to be a ratio of $H_2O/CH_4=3$, the resulting mixed gas was heated previously to 600° C., and introduced into the reaction vessel 21 in a ratio of 1 L/minute through a gas introduction pipe 22. The pressure in the reaction vessel 21 was set in 1 atmospheric pressure.

Reforming ratio of the methane in the reformer 30 minutes after the commencement of operation was calculated from the following formula.

Reforming ratio of methane (%)=100−{($CH_4$ number of moles in the produced gas discharged per 1 second)/($CH_4$ number of moles in the produced gas introduced per 1 second)}×100

EXAMPLE 12

Reforming ratio of methane was determined in accordance with the same manner as that of Example 11 except that a carbon dioxide absorbent granulated to have 10 μm average particle diameter and composed of a composition consisting of lithium orthosilicate, lithium metasilicate and sodium carbonate in which the lithium metasilicate was contained in an amount of 10% by weight and sodium carbonate was contained in an amount of 2.85% by weight, was used.

COMPARATIVE EXAMPLE 6

Reforming ratio of methane was determined in accordance with the same manner as that of Example 11 except that a carbon dioxide absorbent granulated to have 10 μm average particle diameter and composed of only lithium orthosilicate containing no lithium metasilicate was used.

The results obtained are shown in the following Table 3.

TABLE 3

|  | Amount of lithium metasilicate (wt %) | Amount of sodium carbonate (mol %) | Reforming ratio of methane (%) |
|---|---|---|---|
| Example 11 | 10 | 0 | 90 |
| Example 12 | 10 | 2.85 | 95 |
| Comparative Example 6 | No addition | No addition | 75 |

As is apparent from Table 3, it has been found that the methane reforming reactions in Example 11 in which a carbon dioxide absorbent composed of lithium orthosilicate and lithium metasilicate, the lithium metasilicate being contained in the range of 5% to 40% by weight with respect to the total amount of the lithium orthosilicate and the lithium metasilicate, is used; and Example 12 in which a carbon dioxide absorbent composed of lithium orthosilicate, lithium metasilicate and sodium carbonate, the lithium metasilicate being contained in the range of 5% to 40% by weight with respect to the total amount of the lithium orthosilicate and the lithium metasilicate, is used, exhibit a high reforming ratio of methane compared with that of the Comparative Example 6 in which the carbon dioxide absorbent composed of lithium orthosilicate alone is used. This is because when lithium metasilicate is added, the absorption rate of carbon dioxide at low concentration increases, so that the reaction equilibrium in the formula (1) shifts towards the right side, whereby the reforming reaction is promoted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A carbon dioxide absorbent comprising:
   lithium silicate containing lithium orthosilicate and lithium metasilicate, the lithium metasilicate being contained in an amount of 5% by weight or more to 40% by weight or less with respect to the total amount of lithium orthosilicate and lithium metasilicate, where the lithium metasilicate produced by reaction of the lithium orthosilicate and carbon dioxide is excluded.

2. The absorbent according to claim 1, wherein the lithium metasilicate is contained in an amount of 10% by weight or more to 30% by weight or less with respect to the total amount of lithium orthosilicate and lithium metasilicate.

3. The absorbent according to claim 1, wherein the lithium metasilicate is contained in an amount of 10% by weight or more to 26% by weight or less with respect to the total amount of lithium orthosilicate and lithium metasilicate.

4. The absorbent according to claim 1, further comprising at least one alkali-based compound selected from the group consisting of alkali carbonates, alkali earth carbonates, and alkali halides.

5. The absorbent according to claim 4, wherein the alkali-based compound is contained in an amount of 0.5 to 20 mol % with respect to the total amount of lithium orthosilicate, lithium metasilicate and alkali-based compound.

6. The absorbent according to claim 4, wherein a molar ratio of the lithium metasilicate with respect to the alkali-based compound is 0.04 to 0.35.

7. The absorbent according to claim 1, wherein the absorbent is a porous.

8. A carbon dioxide separating apparatus comprising:
a reaction vessel provided with introduction and discharge pipes for carbon dioxide;
a carbon dioxide absorbent stored in the reaction vessel, including lithium silicate containing lithium orthosilicate and lithium metasilicate, the lithium metasilicate being contained in an amount of 5% by weight or more to 40% by weight or less with respect to the total amount of lithium orthosilicate and lithium metasilicate, where the lithium metasilicate produced by reaction of the lithium orthosilicate and carbon dioxide is excluded; and
heating means disposed around the outer circumference of the reaction vessel for supplying heat to the reaction vessel.

9. The apparatus according to claim 8, wherein the carbon dioxide absorbent further includes at least one alkali-based compound selected from the group consisting of alkali carbonates, alkali earth carbonates, and alkali halides.

10. The apparatus according to claim 9, wherein the alkali-based compound is contained in an amount of 0.5 to 20 mol % with respect to the total amount of lithium orthosilicate, lithium metasilicate and alkali-based compound.

11. The apparatus according to claim 9, wherein a molar ratio of the lithium metasilicate with respect to the alkali-based compound is 0.04 to 0.35.

12. The apparatus according to claim 8, wherein the carbon dioxide absorbent is a porous.

13. A reformer comprising:
a reaction vessel having an introduction pipe which introduces a raw material gas containing carbon and steam, and a discharge pipe which discharges a produced gas;
a solid catalyst stored in the reaction vessel to promote a reforming reaction;
a carbon dioxide absorbent stored in the reaction vessel, including lithium silicate containing lithium orthosilicate and lithium metasilicate, the lithium metasilicate being contained in an amount of 5% by weight or more to 40% by weight or less with respect to the total amount of lithium orthosilicate and lithium metasilicate, where the lithium metasilicate produced by reaction of the lithium orthosilicate and carbon dioxide is excluded; and
heating means disposed around the outer circumference of the reaction vessel for supplying heat to the reaction vessel.

14. The reformer according to claim 13, wherein the carbon dioxide absorbent further includes at least one alkali-based compound selected from the group consisting of alkali carbonates, alkali earth carbonates, and alkali halides.

15. The reformer according to claim 14, wherein the alkali-based compound is contained in an amount of 0.5 to 20 mol % with respect to the total amount of lithium orthosilicate, lithium metasilicate and alkali-based compound.

16. The reformer according to claim 14, wherein a molar ratio of the lithium metasilicate with respect to the alkali-based compound is 0.04 or more to 0.35.

17. The reformer according to claim 13, wherein the carbon dioxide absorbent is a porous.

* * * * *